(12) United States Patent
Kim

(10) Patent No.: US 8,175,386 B2
(45) Date of Patent: May 8, 2012

(54) IMAGE ACQUIRING APPARATUS AND CONTROL METHOD THEREOF

(75) Inventor: Seok-Ho Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 866 days.

(21) Appl. No.: 12/257,721

(22) Filed: Oct. 24, 2008

(65) Prior Publication Data
US 2009/0161979 A1 Jun. 25, 2009

(30) Foreign Application Priority Data
Dec. 24, 2007 (KR) .......................... 10-2007-0136098

(51) Int. Cl.
*G06K 9/36* (2006.01)
(52) U.S. Cl. .......................... 382/176; 382/274; 358/464
(58) Field of Classification Search .................. 382/176, 382/274, 319; 358/516, 446, 461, 464
See application file for complete search history.

(56) References Cited

U.S. PATENT DOCUMENTS

| 5,130,822 A * | 7/1992 | Nagata et al. ................. 358/461 |
| 5,214,520 A * | 5/1993 | Miyazawa ..................... 358/461 |
| 2006/0139700 A1* | 6/2006 | Murakami et al. ............ 358/474 |

FOREIGN PATENT DOCUMENTS

| JP | 07-322069 A | 12/1995 |
| JP | 2002-077618 A | 3/2002 |

OTHER PUBLICATIONS

Machine English language translation of JP 07-322069, published Dec. 8, 1995.
Machine English language translation of JP 2002-077618, published Mar. 15, 2008.

* cited by examiner

*Primary Examiner* — Andrew W Johns
(74) *Attorney, Agent, or Firm* — Staas & Halsey LLP (57) ABSTRACT

An image acquiring apparatus includes: an image sensor which senses light reflected from an object to be read, and which detects an analog pixel value corresponding to the sensed reflected light; and a compensator which compensates the analog pixel value in its analog form for removing a background of the object contemporaneously as the object is being read in line(s).

17 Claims, 6 Drawing Sheets

IMAGE ACQUIRING APPARATUS AND CONTROL METHOD THEREOF

CROSS-REFERENCE TO RELATED APPLICATION

This application claims priority from Korean Patent Application No. 10-2007-0136098, filed on Dec. 24, 2007 in the Korean Intellectual Property Office, the disclosure of which is incorporated herein by reference.

BACKGROUND OF INVENTION

1. Field of Invention

Apparatuses and methods consistent with the present invention relate to an image acquiring and/or forming apparatus and a control method thereof, and more particularly, to an image acquiring/forming apparatus having an auto background removal (ABR) function and a control method thereof.

2. Description of the Related Art

An image acquiring apparatus such as a digital camera, scanner, facsimile machine, copying machine, multi-function peripheral (MFP), or the like, may employ one or more components, e.g., a charge coupled device (CCD), a contact image sensor (CIS), or the like, for reading or scanning, e.g., a document. Such an image acquiring apparatus may implement an auto background removal (ABR) or auto background suppression (ABS) function for improving the quality of the acquired image and/or (when the scanned image is to be reproduced) for saving developer (toner, ink or the like) when the document being scanned and/or copied has a background that is not entirely white, but that has a non-white color or tint, such as, e.g., some recycled paper or newspapers.

In a conventional image acquiring apparatus, in order to perform the background removal operation, a light source carriage is moved to a certain end portion of the original image or document to be read, and the detected color or gray shade at the end portion is used for the auto background removal function.

However, the foregoing method of reading a portion of the document for the purpose of the background removal requires an extraneous reading or scanning operation, and thus may increase the operational time. In addition, since the auto background removal function is performed based not on the entire background of the document, but is based only on the reading of a portion of the document, the result of the background removal may not be accurate. Moreover, it is difficult to apply the foregoing method when an automatic document feeder (ADF) mode is used, under which mode the document to be read itself moves with respect to a stationary light source carriage.

Another conventional method of background removal applies analog/digital (A/D) conversion to the image that has been read, and compensates the image in the form of the converted digital data using a lookup table (LUT) such as, e.g., a gamma 1-D table, for the background removal.

However, even in this conventional compensation method, data loss can occur during the A/D conversion operation, causing the compensation of the background to be inaccurate.

SUMMARY OF THE INVENTION

Accordingly, it is an aspect of the present invention to provide an image acquiring apparatus and a control method thereof, in which the background removal of an image object to be read may be performed contemporaneously with the reading of the image object, making a separate extraneous reading of the object solely for the purpose of background removal unnecessary.

Another aspect of the present invention is to provide an image acquiring apparatus and a control method thereof, in which the background removal operation may be performed on the acquired analog image data in analog form, in which thereby inaccuracies in the background removal that may be caused due to the data loss during an Analog-to-Digital (A/D) conversion.

The foregoing and/or other aspects of the present invention can be achieved by providing an image acquiring apparatus, which may comprise: an image sensor having a sensor input, said image sensor being configured to receive through the sensor input light reflected from a visual image source including a visual object to be read and a background, the image sensor having a sensor output through which one or more analog pixel values corresponding to the sensed reflected light are output, the one or more analog pixel values each being an analog signal; and a compensator coupled to the sensor output, the compensator being configured to receive the one or more analog pixel values from the sensor output, and to perform compensation operation on the received one or more analog pixel values to produce one or more compensated analog pixel values, the compensator including a compensator output through which the one or more compensated analog pixel values are output, ones of the one or more compensated analog pixel values corresponding to the background having an analog signal level representing substantially a white image.

The image acquiring apparatus may further include an A/D converter having an analog input coupled to the compensator output, the A/D converter being configured to receive through the analog input the one or more compensated analog pixel values from the compensator output, the A/D converter being configured to perform an analog-to-digital conversion of the received one or more compensated analog pixel values to produce one or more digital pixel values, the one or more digital pixel values each representing a corresponding one of the one or more compensated analog pixel values as a number of data bits, the A/D converter including an output through which the one or more digital pixel values are output.

The image acquiring apparatus may further include a reference value storage having an access port through which a reference value is stored into, and retrieved from the reference value storage.

The compensator may be coupled to the access port of the reference value storage, and is configured to receive the reference value from the access port, and to compare the one or more analog pixel values received from the image sensor with the reference value.

The compensator may be coupled to the access port of the reference value storage, and is configured to receive the reference value from the access port, the compensator being further configured to calculate an amplification gain, the amplification gain being a ratio of a largest value among the one or more analog pixel values to the reference value, and the one of the one or more compensated analog pixel values each being corresponding one of the one or more analog pixel values that had been amplified by the compensator using the amplification gain.

The compensator may determine a new reference value for replacing the reference value stored in the reference value storage, the new reference value being an average of a maximum distribution value and the reference value if the maximum distribution value is equal to or higher than the reference value, the maximum distribution value being a value that is most common among the one or more analog pixel values, the new reference value being the reference value if the maximum distribution value is lower than the reference value.

the compensator may include a programmable gain amplifier calculator configured to calculate the amplification gain; and an amplifier configured to multiply each of the one or more analog pixel values by the amplification gain.

The image sensor may be configured to read sequentially a plurality of sets of one or more lines of the visual image source, the one or more analog pixel values being a first set of analog pixel values corresponding to a first one of the plurality of sets of one or more lines, and the compensator may use the new reference value in determining a new amplification gain by which to amplify a second set of analog pixel values corresponding to a second one of the plurality of sets of one or more lines.

The image acquiring apparatus may further include an image processor having an input through which to receive the one or more digital pixel values from the A/D converter, image processor being configured to perform at least a shading correction on the one or more digital pixel values to produce digital image data representative of the visual object.

The foregoing and/or other aspects of the present invention can also be achieved by providing a method of controlling an image acquiring apparatus, which may comprise sensing light reflected from a visual image source including a visual object to be read and a background, and producing one or more analog pixel values based on the sensed reflected light, the one or more analog pixel values each being an analog signal; performing a compensation operation on the one or more analog pixel values, and producing thereby one or more compensated analog pixel values, ones of the one or more compensated analog pixel values corresponding to the background having an analog signal level representing substantially a white image; and performing an analog-to-digital conversion of the one or more compensated analog pixel values to produce one or more digital pixel values representing at least a portion of the visual object.

The method may further comprise: storing reference value in a memory, where the step of performing the compensation operation may further comprise comparing the one or more analog pixel values with the reference value.

The method may further comprise: storing reference value in a memory, where the step of performing the compensation operation may further comprise: calculating an amplification gain, the amplification gain being a ratio of a largest value among the one or more analog pixel values to the reference value; and amplifying each of the one of the one or more analog pixel values using the amplification gain to produce the one or more compensated analog pixel values.

The method may further comprise: determining a new reference value, the new reference value being an average of a maximum distribution value and the reference value if the maximum distribution value is equal to or higher than the reference value, the maximum distribution value being a value that is most common among the one or more analog pixel values, the new reference value being the reference value if the maximum distribution value is lower than the reference value; and storing the new reference value in the memory.

The step of sensing light reflected from the visual image source may comprise sequentially sensing a plurality of sets of one or more lines of the visual image source, the one or more analog pixel values being a first set of analog pixel values corresponding to a first one of the plurality of sets of one or more lines, and the method may further comprise: calculating a new amplification gain, the new amplification gain being a ratio of the largest value among the one or more analog pixel values to the new reference value; and amplifying each of a second set of analog pixel values corresponding to a second one of the plurality of sets of one or more lines to produce a second one or more compensated analog pixel values.

BRIEF DESCRIPTION OF THE DRAWINGS

The above and/or other aspects of the present invention will become apparent and more readily appreciated from the following description of the embodiments, taken in conjunction with the accompanying drawings, in which.

DETAILED DESCRIPTION OF EMBODIMENTS OF THE INVENTION

Reference will now be made in detail to the embodiments of the present invention, examples of which are illustrated in the accompanying drawings, wherein like reference numerals refer to like elements throughout. The embodiments are described below in references to the figures.

Figure 1:
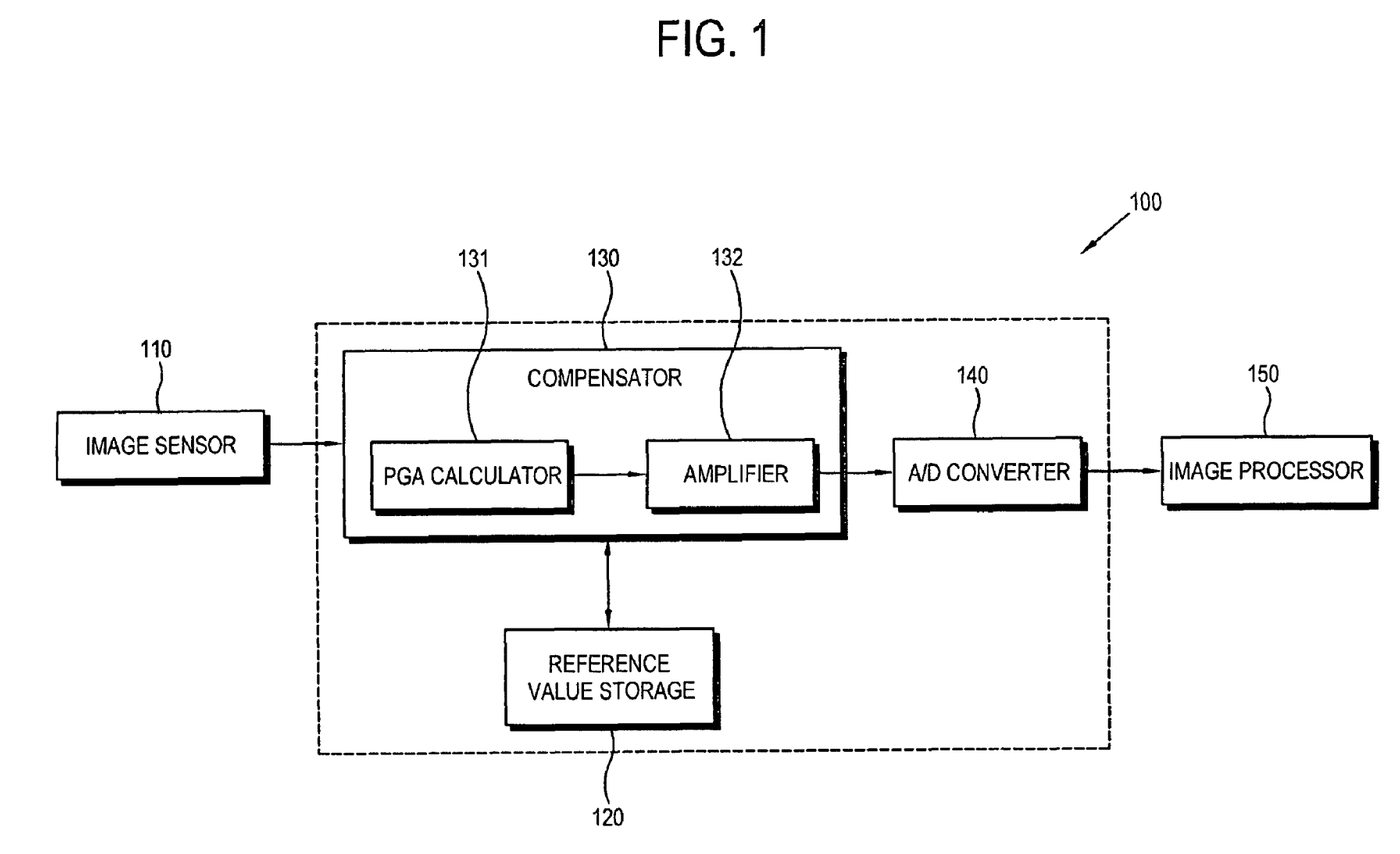
FIG. 1 is a block diagram of an image acquiring apparatus according to an embodiment of the present invention.

FIG. 1 is a block diagram of an image acquiring apparatus 100 according to an embodiment of the present invention.

According to the embodiment, the image acquiring apparatus 100, which may be, e.g., a digital camera, a facsimile machine, a scanner, a copying machine, a multi-function peripheral (MFP), or the like. While not shown, the image acquiring apparatus 100 of an embodiment of the present invention may include components that forms a visible image on a display screen or on a print medium from the image data processed by the image processor (IP) 150. For example, the image acquiring apparatus 100 may include a laser or ink jet printing that forms a visual reproduction or rendition of the acquired image on a tangible medium, e.g., a sheet of paper. It should thus be understood that when a reference is made herein to an image acquiring apparatus, such image acquiring apparatus may encompass the capability of image forming, and thus can also be an image forming apparatus.

The image acquiring apparatus 100 may employ an image sensor 110, which may be, without limitation, e.g., a charge coupled device (CCD), CMOS image sensors, a contact image sensor (CIS), or the like, and which includes a sensor input for acquiring an image from a document or any other source of visible image. Further, the image acquiring apparatus 100 implements an auto background removal (ABR) or auto background suppression (ABS) function.

As shown in FIG. 1, the image acquiring apparatus 100 may also include a reference value storage 120, a compensator 130, an analog/digital (A/D) converter 140, and an image processor (IP) 150. The compensator 130 may in turn include a programmable gain amplifier (PGA) calculator 131 and an amplifier 132. The reference value storage 120 may be any storage device, including, e.g., a random access memory (RAM) or a non-volatile memory, e.g., a read-only-memory (ROM) or a flash memory, or the like, of an appropriate size, and can be a standalone memory device, or can be embedded as an integrated circuit along with the compensator 130. The reference value storage 120 may include an access port through which the compensator 130 may access the reference value storage 120, e.g., to write data thereto and read data therefrom.

The image sensor 110 through its sensor input receives light reflected from the object to be read, and produces at its sensor output analog pixel values corresponding to the sensed light. A light source (not shown) provided in the image acquiring apparatus 100 according to this embodiment emits a light that is made to be incident one or more lines of the document to be read. Then, the image sensor 110 receives the light reflected from the document, the receives reflected light carrying information about the image on the document, and produces at its sensor output signals corresponding to the image, for example, in the form of analog pixel values, which may be represented as, e.g., a level of voltage corresponding to each of the pixels along the line(s) read. To this end, the image sensor 110 may include a plurality of sensors arranged as an array or a line of sensor pixels.

Figure 2:
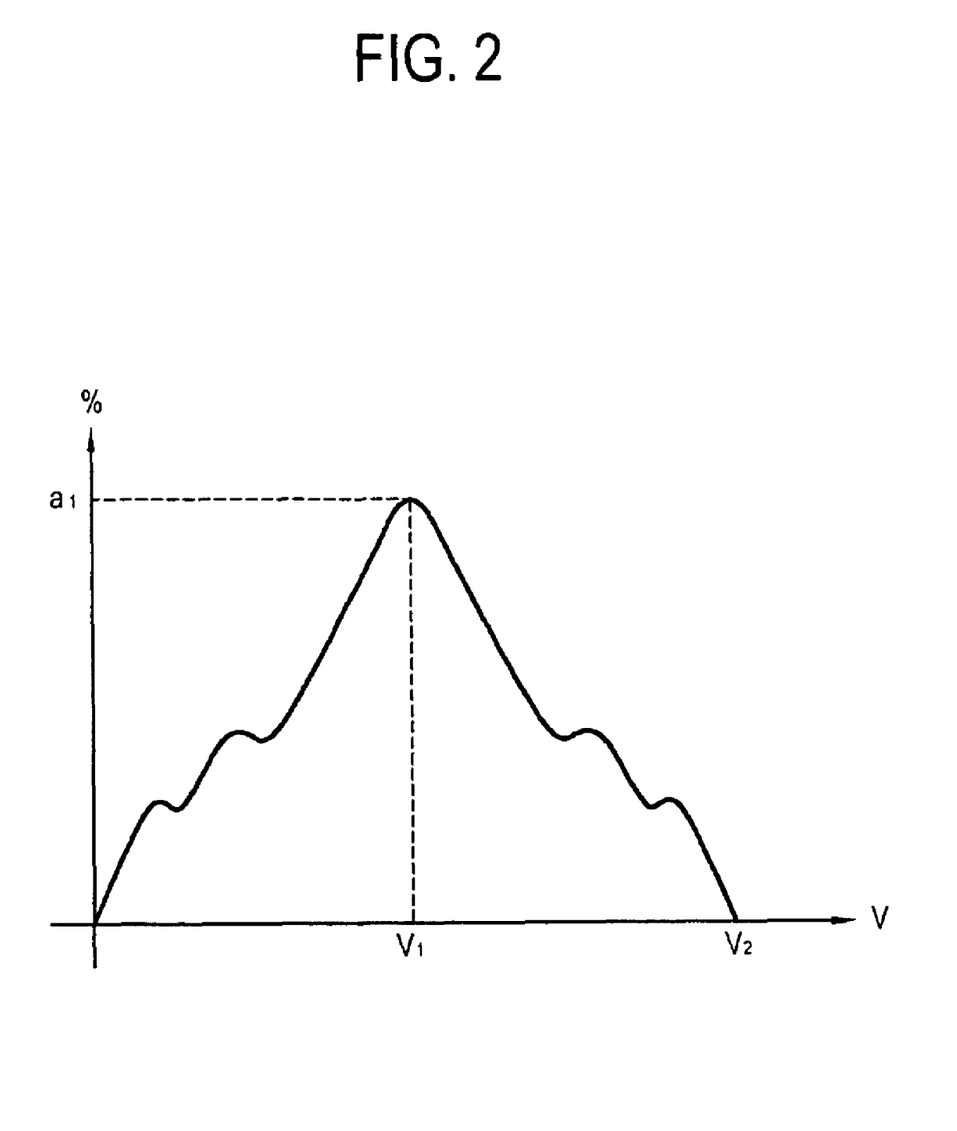
FIG. 2 is a graph showing a distribution curve of an analog pixel value detected with respect to a line of image according to an embodiment of the present invention.

FIG. 2 illustrates a distribution curve of analog pixel values detected during the reading of a line according to the embodiment. As shown in FIG. 2, the analog pixel values detected with regard to the line has a distribution (%) as, in this example, represented by the voltage corresponding to the each pixel. Here, the analog pixel value represents the color or gray level being closer to white as higher voltage level is produced by the image sensor 110 corresponding to the pixel. For example, a measured voltage level of '0' represents a black image at the corresponding pixel while the voltage level of 'V2' corresponds to a pixel having a white image. While a full color image being sensed by the image sensor 110 is within the contemplation of the embodiments described herein, it should be understood that the image on the document being read may also only be a black and white image, in which case the analog pixel values each represent the shades of gray or the darkness of the image at the corresponding pixel.

According to an embodiment, the image acquiring apparatus 100 updates the reference value for a scanned line on the basis of the most common pixel value among the detected line(s) of analog pixel values. For example, in the embodiment shown in FIG. 2, the reference value may be selected on the basis of the peak value V1 corresponding to the highest distribution $a_1$. The peak value V1 may, e.g., correspond to a gray color of a particular shade, is used as a reference value in the background removal operation.

The reference value storage 120 stores the reference value for removing the background per line(s). In the embodiment described hereafter, for brevity sake, it is assumed that the image sensor 110 reads only one line per reading operation, and that a reference value is updated per each such read operation, e.g., per each line of detected image. However, the present invention is not so limited to scanning of a single line at a time, but rather encompasses reading or scanning of a set of multiple lines at a time, in which case a new reference value may be determined for each such set of lines read. The reference value applied to the first line (or the first set of lines) may be set, e.g., by a user input or as a default value.

The compensator 130 compensates the analog pixel value to remove the background of the document being read on a line-by-line basis. In particular, the compensator 130 compares the reference value stored in the reference value storage 120 with the analog pixel value detected from reading of the current line, and, based on the result of the comparison, effectively removes, as the background, those pixels having corresponding analog pixel value that is equal to or higher than the reference value.

The PGA calculator 131 calculates a PGA value corresponding to the reference value. That is, the PGA calculator 131 calculates the PGA value on the basis of the reference value stored in the reference value storage 120 with respect to the current line and the analog pixel value V2 representing white color among the analog pixel values detected by the image sensor 110. For example, when the white color of the distribution has the pixel value of V2, and when the reference value is V0, the PGA value may be V2/V0.

The reference value V0 and the pixel value corresponding to white V2 may be thought of as digital data, which may result from a conversion by the AD converter 140 (which will be described further below). For example, if the pixel value corresponding to white is the vale '1024' and the reference value correspond to the value '512' (e.g., in case of a 10-bit AD converter), the PGA value may be '1024/512,' or 2.

The amplifier 132 multiplies the analog pixel value by the calculated PGA value, thereby outputting an amplified analog pixel value.

Figure 3:
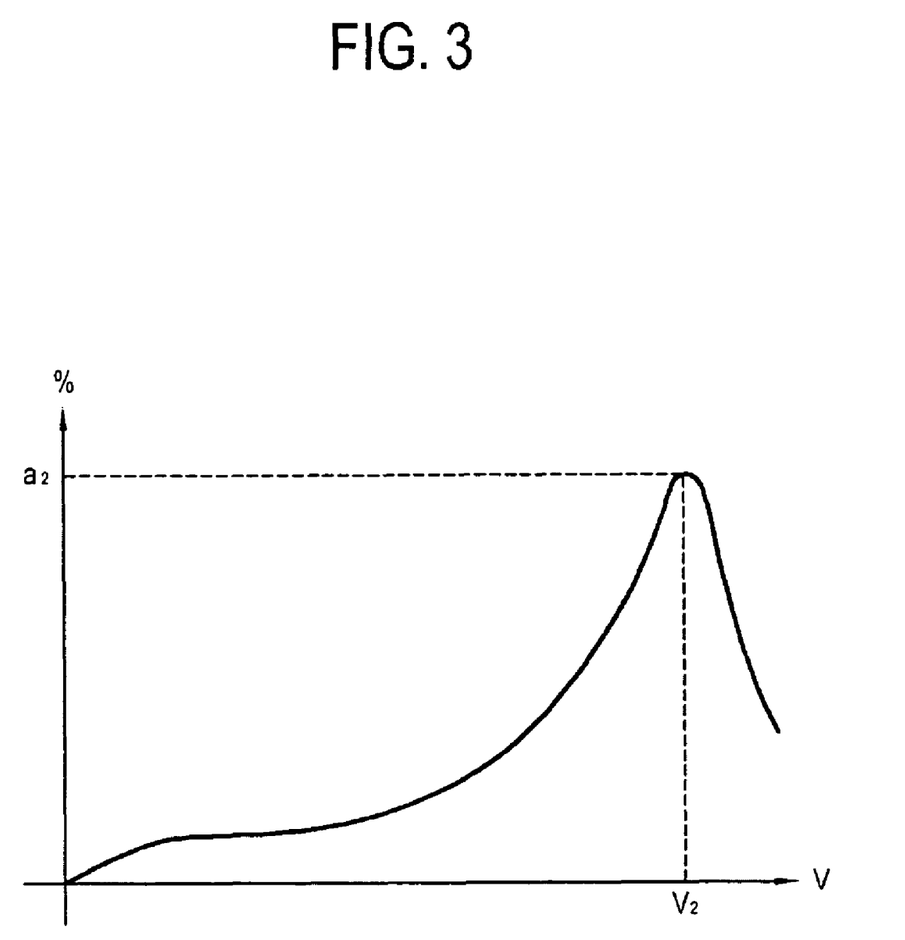
FIG. 3 is a graph showing a distribution curve of an amplified analog pixel value according to an embodiment of the present invention.

FIG. 3 illustrates an example distribution curve of the amplified analog pixel value according the present embodiment. As shown in FIG. 3, the amplified analog pixel values output from the amplifier 132 has a large distribution around the proximity of the white pixel value V2. As a result of the amplification, the data corresponding pixels distributed around V2 will be treated as white images, and are thus effectively removed as the background. That is, if, for example, the PGA is '2,' the digital pixel value of '512' becomes, after the amplification, '1024,' which represents the white color.

The compensator 130 determines the reference value to be applied to the next line, on the basis of the analog pixel value detected with regard to the current line. Referring again to FIG. 2, the compensator 130 compares the maximum distribution value V1, of the distribution of the analog pixel values with respect to the current line, with the reference value V0 stored in the reference value storage 120.

If V1 is equal to or higher than V0, the compensator 130 replaces the current reference value by an average of V1 and V0, and stores the average value as the new reference value in the reference value storage 120. The compensator 130 applies the updated reference value during the reading of the next line, amplifies the analog pixel values of the pixels of the next line as previously described, and thereby effectively removes the background.

According to an embodiment, if, on the other hand, V1 is lower than V0, the compensator 130 maintains the current reference value for use for the next line. The compensator 130 updates the reference value for the next line based not solely on the maximum distribution value V1, but based on the average of V1 and the current reference values, or, in the alternative, applies the same reference value for the next line. This may help to prevent the PGA value being erroneously skewed by the abnormally high pixel value(s) due, e.g., to noise or white dust.

Accordingly, the compensator 130 amplifies the analog pixel value detected from the current line by amplification factor that takes into account the reference value so as to remove the background, and updates the reference value to be applied to the next line in relation to the detected analog pixel value. Such background removal operations are performed in sequence for the remaining lines.

The A/D converter 140 converts the analog pixel values output from the compensator 130 into digital pixel values. In particular, the A/D converter 140 applies sampling, quantization, encoding and the like to the compensated analog pixel values, which may be, e.g., in the form of a certain voltage level, thereby outputting digital image data of certain number of bits for each pixel. The output digital image data may be of, e.g., 10-bits, 8-bits, or of any number of bits.

According to an exemplary embodiment of the present invention, the reference value storage 120, the compensator 130 and the A/D converter 140 may, e.g., be implemented as analog front end devices (AFE). The image processor (IP) 150 applies image processing, which may include, e.g., a shading correction, or the like, to the digital image data obtained through the A/D conversion, thereby generating the final image for display, storage, printing, or the like.

An embodiment of the control method of the image acquiring apparatus 100 having the foregoing configurations will be described with reference to FIGS. 4 through 6.

Figure 4:
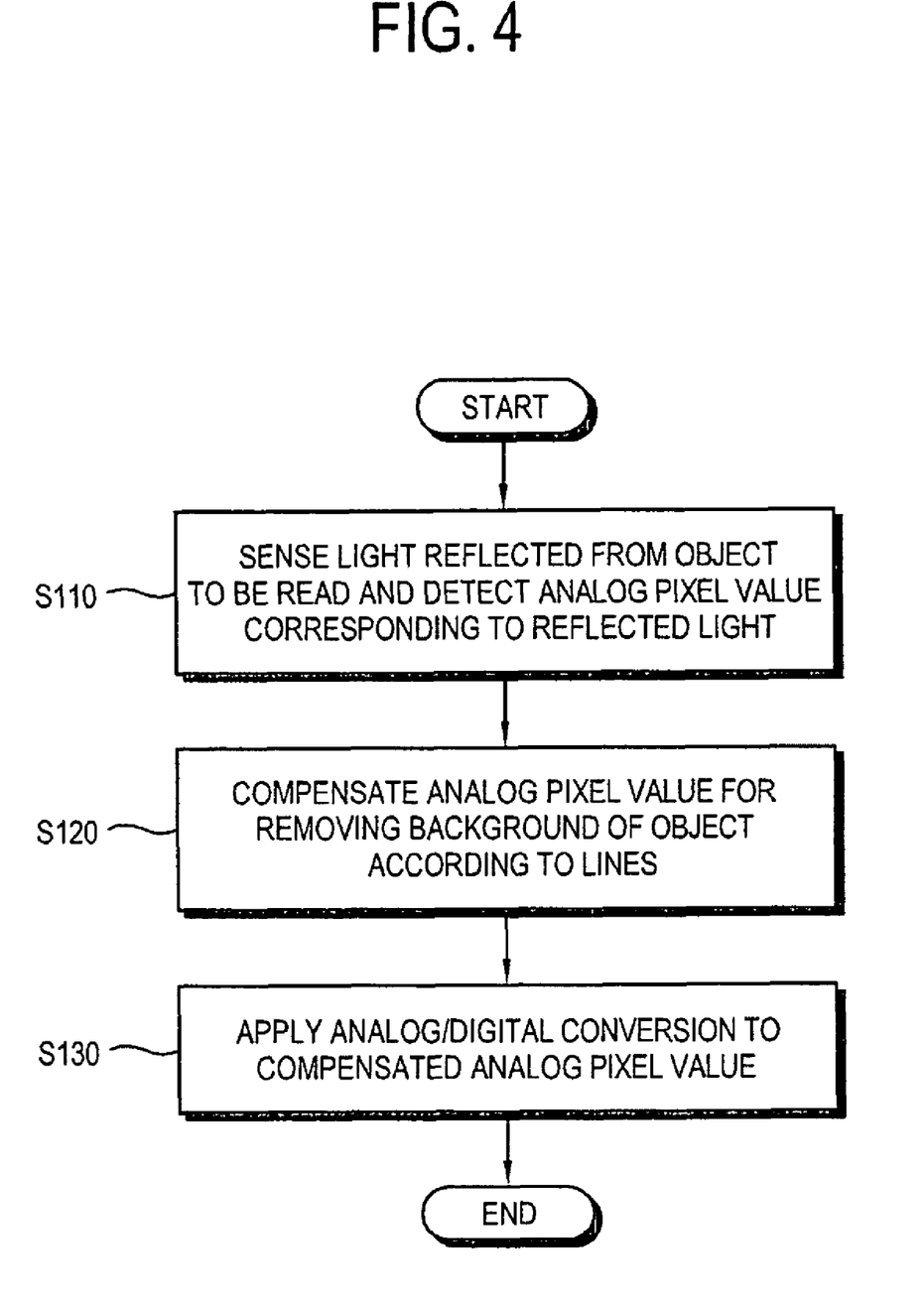
FIGS. 4 through 6 are flowcharts of a control method according to an embodiment of the present invention.

Referring to FIG. 4, in operation step S110, the image sensor 110 of the image acquiring apparatus 100 senses the light reflected from an object to be read, and detects an analog pixel value based on the sensed light.

In operation step S120, the compensator 130 compensates the analog pixel values of each line (or set of lines) detected at the operation S110 so as to remove the background of the object.

Figure 5:
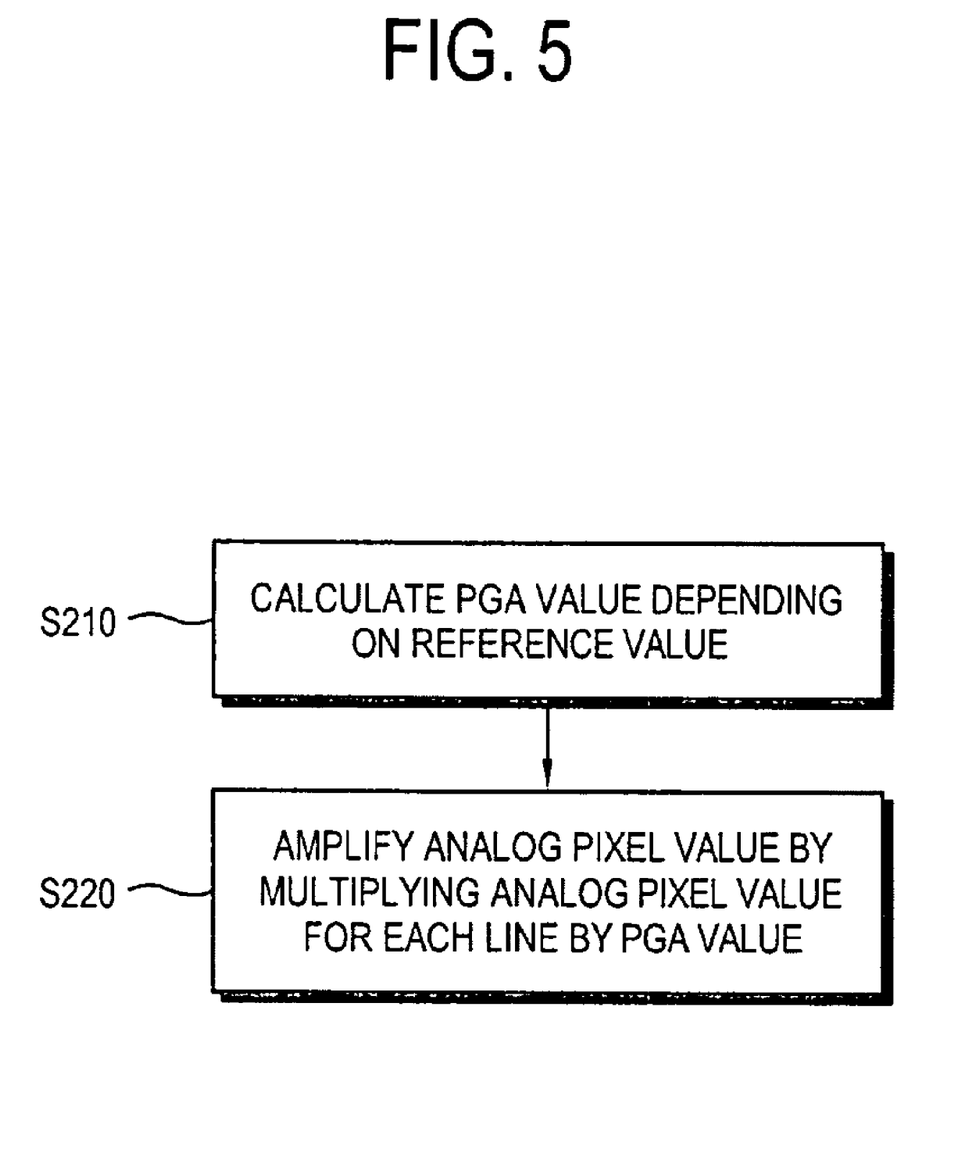

FIG. 5 illustrates the operation of the compensator 130, in operation step S210 of which, the PGA calculator 131 calculates the PGA value based on the reference value for the current line being compensated.

In step S220, the amplifier 132 multiplies the detected analog pixel values of the current line by the calculated PGA value, and outputs the amplified analog pixel value, which represents the line image with the background effectively removed.

Figure 6:
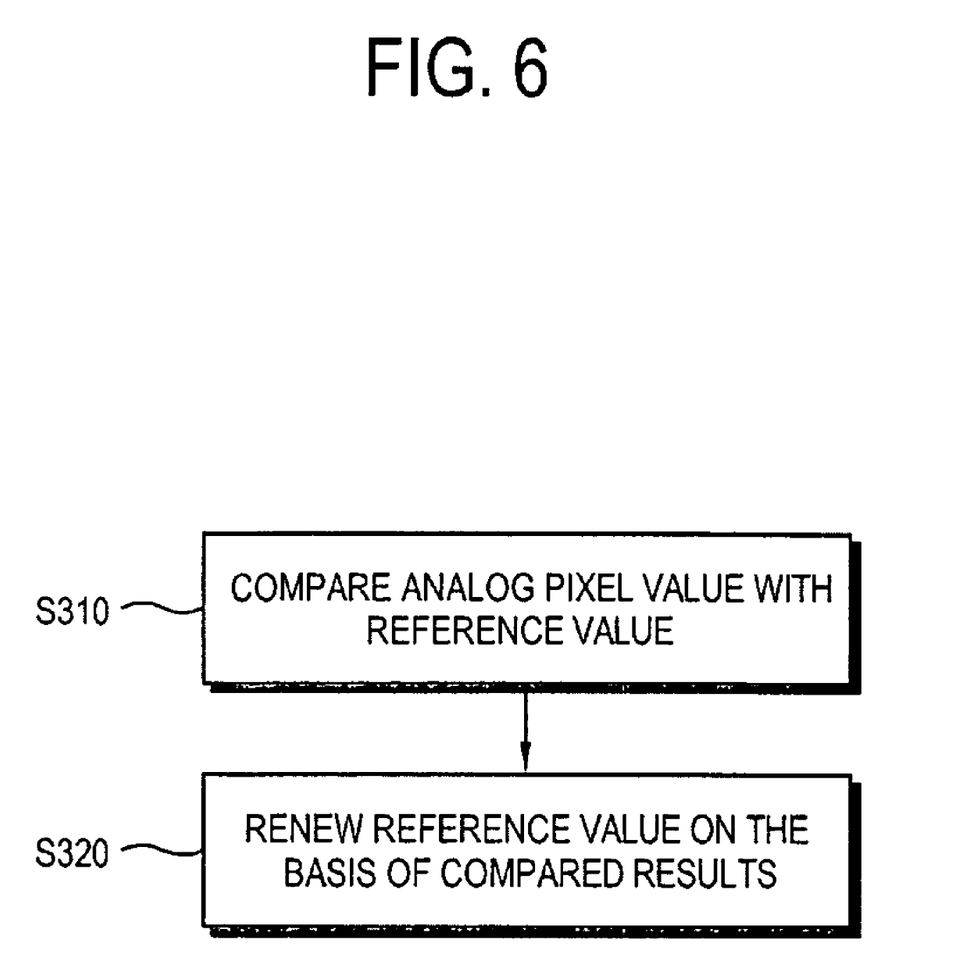

As shown in FIG. 6, in step S310, the compensator 130 (as a part of the operation S120 of FIG. 4) compares the analog pixel values for the current line with the reference value stored in the reference value storage 120. The compensator 130 compensates the analog pixel values on the basis of the result of comparison of the operation S310 so as to remove the background corresponding to the pixels of the line(s) of which analog pixel values are equal to or higher than the reference value.

Further, in operation S310, the compensator 130 determines the reference value to be applied to the next line, on the basis of the result of the comparison of step S310. If the maximum distribution value of the analog pixel value for the current line is equal to and higher than the current reference value, the reference value for the next line is the average of the maximum distribution value and the reference value used for the current line. On the other hand, if the maximum distribution value of the analog pixel value for the current line is lower than the reference value, the reference value for the current line is maintained, and is also used in compensating the next line.

The compensator 130 compensates the analog pixel values in sequence for each (or each subset) of the lines, recalculates the reference value for the next line(s), and stores the recalculated reference value in the reference value storage 120.

Referring back to FIG. 4, the A/D converter 140 applies the A/D conversion to the compensated analog pixel value.

Accordingly, the compensation for removing the background is made to the analog pixel value detected through the image sensor 110 to produce compensated analog pixel data, to which the A/D conversion is applied. Thus, a normal gray level can be formed so that the possibility of data loss is reduced as compared with the case of performing the background removal on the digital data.

As described above, the present invention provides an image acquiring apparatus and a control method thereof, in which a background of an object to be read can be removed as the object is being read, making a separate reading of at least a portion of the object solely for the purpose of background removal unnecessary.

In addition, the background removal is performed by compensating the analog image data in analog form, thereby increasing the accuracy of the compensation for the removal of the background.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An image acquiring apparatus comprising:
   an image sensor having a sensor input, said image sensor being configured to receive through the sensor input light reflected from a visual image source including a visual object to be read and a background, the image sensor having a sensor output through which one or more analog pixel values corresponding to the sensed reflected light are output, the one or more analog pixel values each being an analog signal; and
   a compensator coupled to the sensor output, the compensator being configured to receive the one or more analog pixel values from the sensor output, and to perform compensation operation on the received one or more analog pixel values to produce one or more compensated analog pixel values, the compensator including a compensator output through which the one or more compensated analog pixel values are output, ones of the one or more compensated analog pixel values corresponding to the background having an analog signal level representing substantially a white image.

2. The image acquiring apparatus according to claim 1, further comprising:
   an A/D converter having an analog input coupled to the compensator output, the A/D converter being configured to receive through the analog input the one or more compensated analog pixel values from the compensator output, the A/D converter being configured to perform an analog-to-digital conversion of the received one or more compensated analog pixel values to produce one or more digital pixel values, the one or more digital pixel values each representing a corresponding one of the one or more compensated analog pixel values as a number of data bits, the A/D converter including an output through which the one or more digital pixel values are output.

3. The image acquiring apparatus according to claim 2, further comprising:
   an image processor having an input through which to receive the one or more digital pixel values from the A/D converter, image processor being configured to perform at least a shading correction on the one or more digital pixel values to produce digital image data representative of the visual object.

4. The image acquiring apparatus according to claim 1, further comprising:
   a reference value storage having an access port through which a reference value is stored into, and retrieved from the reference value storage.

5. The image acquiring apparatus according to claim 4, wherein:
the compensator is coupled to the access port of the reference value storage, the compensator being configured to receive the reference value from the access port, and to compare the one or more analog pixel values received from the image sensor with the reference value.

6. The image acquiring apparatus according to claim 4, wherein:
the compensator is coupled to the access port of the reference value storage, the compensator being configured to receive the reference value from the access port, the compensator being further configured to calculate an amplification gain, the amplification gain being a ratio of a largest value among the one or more analog pixel values to the reference value, and
wherein the one of the one or more compensated analog pixel values each being corresponding one of the one or more analog pixel values that had been amplified by the compensator using the amplification gain.

7. The image acquiring apparatus according to claim 6, wherein the compensator comprises:
a programmable gain amplifier calculator configured to calculate the amplification gain; and
an amplifier configured to multiply each of the one or more analog pixel values by the amplification gain.

8. The image acquiring apparatus according to claim 4, wherein:
the compensator determines a new reference value for replacing the reference value stored in the reference value storage, the new reference value being an average of a maximum distribution value and the reference value if the maximum distribution value is equal to or higher than the reference value, the maximum distribution value being a value that is most common among the one or more analog pixel values, the new reference value being the reference value if the maximum distribution value is lower than the reference value.

9. The image acquiring apparatus according to claim 8, wherein the image sensor is configured to read sequentially a plurality of sets of one or more lines of the visual image source, the one or more analog pixel values being a first set of analog pixel values corresponding to a first one of the plurality of sets of one or more lines, and
wherein the compensator uses the new reference value in determining a new amplification gain by which to amplify a second set of analog pixel values corresponding to a second one of the plurality of sets of one or more lines.

10. The image acquiring apparatus according to claim 4, wherein:
the compensator compares the reference value stored in the reference value storage with the one or more analog pixel value received from the image sensor, and compensate the one or more analog pixel value that is equal to or higher than the reference value having an analog signal level representing substantially a white image.

11. A method of controlling an image acquiring apparatus, the method comprising:
sensing light reflected from a visual image source including a visual object to be read and a background, and producing one or more analog pixel values based on the sensed reflected light, the one or more analog pixel values each being an analog signal;
performing a compensation operation on the one or more analog pixel values, and producing thereby one or more compensated analog pixel values, ones of the one or more compensated analog pixel values corresponding to the background having an analog signal level representing substantially a white image.

12. The method according to claim 11, further comprising:
performing an analog-to-digital conversion of the one or more compensated analog pixel values to produce one or more digital pixel values representing at least a portion of the visual object.

13. The method according to claim 11, further comprising:
storing reference value in a memory,
wherein the step of performing the compensation operation further comprises comparing the one or more analog pixel values with the reference value.

14. The method according to claim 13, wherein the step of performing the compensation operation further comprises compensating the one or more analog pixel value that is equal to or higher than the reference value having an analog signal level representing substantially a white image.

15. The method according to claim 11, further comprising:
storing reference value in a memory,
wherein the step of performing the compensation operation further comprises:
calculating an amplification gain, the amplification gain being a ratio of a largest value among the one or more analog pixel values to the reference value; and
amplifying each of the one of the one or more analog pixel values using the amplification gain to produce the one or more compensated analog pixel values.

16. The method according to claim 15, further comprising:
determining a new reference value, the new reference value being an average of a maximum distribution value and the reference value if the maximum distribution value is equal to or higher than the reference value, the maximum distribution value being a value that is most common among the one or more analog pixel values, the new reference value being the reference value if the maximum distribution value is lower than the reference value; and
storing the new reference value in the memory.

17. The method according to claim 16, wherein the step of sensing light reflected from the visual image source comprises sequentially sensing a plurality of sets of one or more lines of the visual image source, the one or more analog pixel values being a first set of analog pixel values corresponding to a first one of the plurality of sets of one or more lines, the method further comprising:
calculating a new amplification gain, the new amplification gain being a ratio of the largest value among the one or more analog pixel values to the new reference value; and
amplifying each of a second set of analog pixel values corresponding to a second one of the plurality of sets of one or more lines to produce a second one or more compensated analog pixel values.

* * * * *